(12) United States Patent
Kang et al.

(10) Patent No.: US 11,524,653 B1
(45) Date of Patent: Dec. 13, 2022

(54) SEAT BELT MOUNTING STRUCTURE

(71) Applicant: Hyundai Motor Company, Seoul (KR)

(72) Inventors: Ho Je Kang, Gyeonggi-do (KR); Hae Hoon Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/513,769

(22) Filed: Oct. 28, 2021

(30) Foreign Application Priority Data

May 31, 2021 (KR) .................. 10-2021-0070368

(51) Int. Cl.
  *B60R 22/24*  (2006.01)
(52) U.S. Cl.
  CPC .................. *B60R 22/24* (2013.01)
(58) Field of Classification Search
  CPC ....................................................... B60R 22/24
  See application file for complete search history.

(56) References Cited

U.S. PATENT DOCUMENTS

| | | | | |
|---|---|---|---|---|
| 5,344,188 A | * | 9/1994 | Mims ...................... | B60R 22/22 280/808 |
| 5,855,407 A | * | 1/1999 | Fukuda ................ | B62D 25/087 296/203.03 |
| 6,302,442 B1 | | 10/2001 | Shimozawa | |
| 8,807,598 B2 | * | 8/2014 | Strnad ..................... | B60R 22/24 297/483 |
| 11,186,319 B2 | * | 11/2021 | Greggs ................... | B62D 27/02 |
| 2009/0051155 A1 | * | 2/2009 | Amano .................... | B60R 22/24 280/801.2 |
| 2017/0233009 A1 | * | 8/2017 | Miranda ................ | B62D 25/04 296/193.06 |
| 2018/0265138 A1 | * | 9/2018 | Nakayama ........... | B62D 27/023 |

FOREIGN PATENT DOCUMENTS

| | | | | | |
|---|---|---|---|---|---|
| DE | 102008039139 A1 | * | 2/2009 | ............. | B60R 22/24 |
| DE | 102017011779 A1 | * | 8/2018 | ............. | B62D 21/15 |
| EP | 2213529 A1 | * | 8/2010 | ............. | B60R 22/24 |
| EP | 3546322 A1 | * | 10/2019 | ............. | B60R 22/24 |
| FR | 2922179 A1 | * | 4/2009 | ............. | B62D 25/02 |
| JP | 1992053326 | | 12/1992 | | |
| JP | 2000168498 A | * | 6/2000 | | |
| JP | 2001191898 A | | 7/2001 | | |
| JP | 2001328562 A | | 11/2001 | | |
| JP | 2002302012 A | * | 10/2002 | | |
| JP | 2004082885 A | * | 3/2004 | | |
| JP | 2004130826 A | * | 4/2004 | | |
| JP | 2004256057 A | | 9/2004 | | |

(Continued)

*Primary Examiner* — Nicole T Verley
(74) *Attorney, Agent, or Firm* — Fox Rothschild LLP

(57) ABSTRACT

A seat belt mounting structure includes a reel mounting reinforcement configured to connect a quarter inner panel, a roof center rail, and a roof rear rail; a C-pillar reinforcement formed to extend toward the quarter inner panel behind a C-pillar; and a seat belt reel mounted on the reel mounting reinforcement toward the roof center rail, the reel mounting reinforcement toward the quarter inner panel, and the C-pillar reinforcement. The seat belt mounting structure is arranged to reinforce a portion in which a seat belt is mounted, while having a reduced number of parts for anchoring the seat belt, and efficiently distributing a mounting load of the seat belt.

8 Claims, 5 Drawing Sheets

(56) References Cited

FOREIGN PATENT DOCUMENTS

| | | | | | |
|---|---|---|---|---|---|
| JP | 2008062748 | A | | 3/2008 | |
| JP | 2008068755 | A | * | 3/2008 | |
| JP | 2008087609 | A | * | 4/2008 | |
| JP | 2008239128 | A | * | 10/2008 | |
| JP | 4271055 | B2 | * | 6/2009 | |
| JP | 2009190688 | A | * | 8/2009 | |
| JP | 2009280153 | A | * | 12/2009 | |
| JP | 2011025848 | A | * | 2/2011 | |
| JP | 2011201389 | A | * | 10/2011 | |
| JP | 2012101720 | A | * | 5/2012 | |
| JP | 2013023038 | A | * | 2/2013 | |
| JP | 2014094636 | A | * | 5/2014 | |
| JP | 5640679 | B2 | * | 12/2014 | |
| JP | 5965278 | B2 | | 8/2016 | |
| JP | 2017056755 | A | * | 3/2017 | |
| JP | 2017056756 | A | * | 3/2017 | |
| WO | WO-2013132888 | A1 | * | 9/2013 | ............. B60R 22/24 |
| WO | WO-2016021051 | A1 | * | 2/2016 | ............. B60R 22/24 |

* cited by examiner

SEAT BELT MOUNTING STRUCTURE

CROSS REFERENCE TO RELATED APPLICATION

The present application claims under 35 U.S.C. § 119(a) the benefit of Korean Patent Application No. 10-2021-0070368 filed on May 31, 2021, the entire contents of which are incorporated by reference herein.

BACKGROUND

(a) Technical Field

The present disclosure relates to a seat belt mounting structure for reinforcing a portion in which a seat belt is mounted, more particularly, to the seat belt mounting structure for reducing a number of parts and increasing rigidity of an anchoring of the seat belt, and efficiently distributing a mounting load of the seat belt.

(b) Description of the Related Art

Since a center seat belt reel of a second row of a recreation vehicle (RV) typically is installed at a corner of an upper end of a D-pillar in a three-point fixing manner, a mounting load of a seat belt is concentrated at the corner.

In order to solve the above problem, a roof rear upper rail and a roof rear lower rail are configured in a closed cross-section structure, thereby reinforcing rigidity of the D-pillar. Accordingly, an additional reinforcing structure is not necessary for a mounting portion of the seat belt.

However, since the roof rear rail is formed of a laminated plate, there is a problem in that a number of parts is increased, and thus a production cost and a weight are increased.

Accordingly, when the roof rear rail is formed of a single plate, the production cost and the weight can be reduced according to reduction of the number of parts. However, due to the reduction, since rigidity of a portion in which the seat belt is mounted is weakened, there is a problem in that an additional reinforcing structure is required, and thus a reinforcement is excessively used.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a seat belt mounting structure that reduces a number of parts for reinforcing a portion in which a seat belt is mounted and increases rigidity of an anchoring of the seat belt.

The present disclosure proposes a seat belt mounting structure for efficiently distributing a mounting load of a seat belt.

According to one aspect, there is provided a seat belt mounting structure including a reel mounting reinforcement configured to connect a quarter inner panel, a roof center rail, and a roof rear rail; a C-pillar reinforcement formed to extend toward the quarter inner panel behind a C-pillar; and a seat belt reel mounted on the reel mounting reinforcement toward the roof center rail, the reel mounting reinforcement toward the quarter inner panel, and the C-pillar reinforcement.

A side surface of the reel mounting reinforcement may be fixed to a side surface of the quarter inner panel, a rear end of the reel mounting reinforcement may be fixed to a front end of the roof rear rail, and an upper surface of a front end of the reel mounting reinforcement may be mounted on an end portion of the roof center rail.

A rear end of a first side of the seat belt reel may be mounted on a front end of the side surface of the reel mounting reinforcement, a rear end of a second side of the seat belt reel may be mounted on the upper surface of the front end of the reel mounting reinforcement, the C-pillar reinforcement may be provided in front of the reel mounting reinforcement, such that a front end of the seat belt reel is mounted on a rear end of the C-pillar reinforcement.

The side surface of the reel mounting reinforcement may be welded and bonded along the side surface of the quarter inner panel, and the quarter inner panel and a D-pillar reinforcement may overlap so as to be welded and bonded between the reel mounting reinforcement and the roof rear rail.

A space of a closed cross-sectional structure may be formed between the roof center rail and the reel mounting reinforcement, and the roof center rail and reel mounting reinforcement may be bonded on front and rear ends of the space.

The quarter inner panel and the reel mounting reinforcement may overlap, and a first mounting portion of the seat belt reel may be bolted in an overlapping portion.

A space of a closed cross-sectional structure may be formed between the roof center rail and the reel mounting reinforcement, and a second mounting portion of the seat belt reel may be bolted to the reel mounting reinforcement constituting the space.

The C-pillar reinforcement and the quarter inner panel may overlap, and a third mounting portion of the seat belt reel may be bolted in an overlapping portion.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
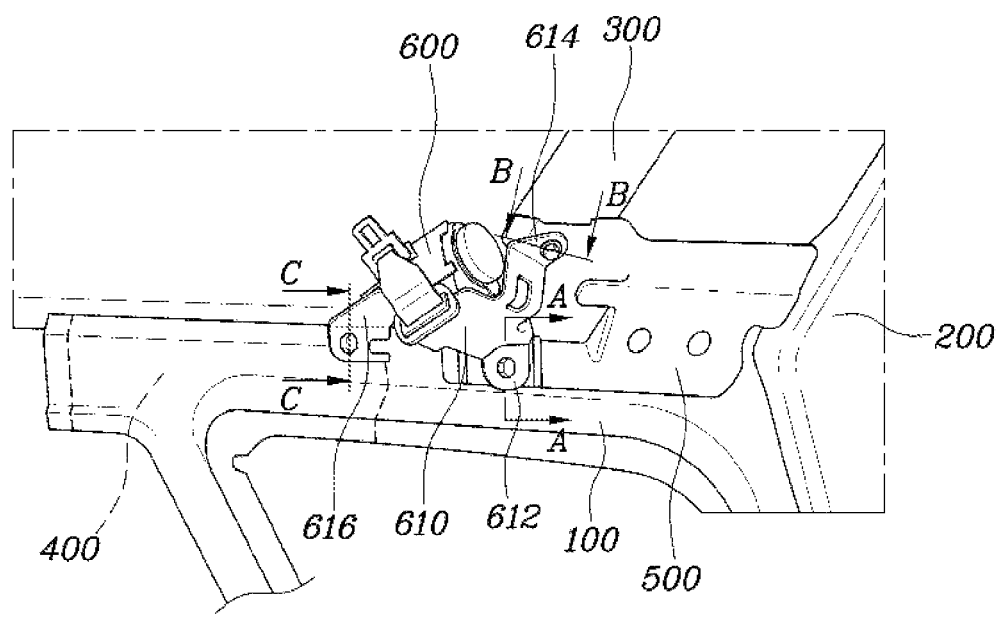
FIG. 1 is a diagram illustrating an upper portion inside a vehicle interior in which a seat belt reel is mounted according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the contrary, when a component is referred to as being "directly connected" or "directly coupled" to another, it should be understood that still another component may not be present between the component and another component. Other expressions describing the relationship between components, that is, "between" and "immediately between," or "adjacent to" and "directly adjacent to" should also be construed as described above.

Unless defined otherwise, all terms including technical or scientific terms used herein have the same meaning as commonly understood by those skill in the art to which the present disclosure pertains. General terms that are defined in a dictionary shall be construed to have meanings that are consistent in the context of the relevant art, and will not be interpreted as having an idealistic or excessively formalistic meaning unless clearly defined in this disclosure.

Exemplary embodiments of the present disclosure will be described below with reference to the accompanying drawings.

FIG. 1 is a diagram illustrating an upper portion inside a vehicle interior in which a seat belt reel 600 is mounted according to the present disclosure.

Referring to FIG. 1, a seat belt mounting structure of the present disclosure includes a reel mounting reinforcement 500 for connecting a quarter inner panel 100, a roof center rail 300, and a roof rear rail 200; a C-pillar reinforcement 400 formed to extend toward the quarter inner panel 100 behind a C-pillar; and the seat belt reel 600 mounted on the reel mounting reinforcement 500 on the roof center rail 300, the reel mounting reinforcement 500 on the quarter inner panel 100, and the C-pillar reinforcement 400.

For example, the quarter inner panel 100 is connected between upper end portions of the C-pillar and a D-pillar, and the roof center rail 300 is connected between the quarter inner panels 100 on both sides in a left-right direction.

In addition, the roof rear rail 200 is connected in a portion in which the quarter inner panel 100 and the D-pillar are connected in the left-right direction.

In addition, the reel mounting reinforcement 500 is formed in the form of a quadrangular plate, fixed to an interior side of the quarter inner panel 100, and connected between the roof center rail 300 and the roof rear rail 200.

In particular, the seat belt reel 600 is mounted on a front end of the reel mounting reinforcement 500 in a three-point fixing manner.

That is, the seat belt reel 600 has a structure fixed in the three-point fixing manner such that one point is coupled to the reel mounting reinforcement 500, which is coupled to the quarter inner panel 100, one point is coupled to the reel mounting reinforcement 500, which is coupled to the roof center rail 300, and one point is coupled to the C pillar.

As described above, according to the present disclosure, since a reinforcement of the reel mounting reinforcement 500 is coupled to a position close to the C-pillar, the seat belt reel 600 together with the reel mounting reinforcement 500 is mounted using the existing C-pillar.

Therefore, since mounting rigidity of the seat belt is secured by adding only the reel mounting reinforcement 500, a production cost and a weight are reduced through a reduction of the number of parts, and rigidity of the anchoring of the seat belt is increased.

In addition, to describe a coupling relationship of the reel mounting reinforcement 500 in more detail, a coupling structure is formed such that a side surface of the reel mounting reinforcement 500 is fixed to a side surface of the quarter inner panel 100, a rear end of the reel mounting reinforcement 500 is fixed to a front end of the roof rear rail 200, and a front end of an upper surface of the reel mounting reinforcement 500 is mounted on an end portion of the roof center rail 300.

That is, since the reel mounting reinforcement 500 is fixed between the roof rear rail 200 and the roof center rail 300 in a front-rear direction, the roof center rail 300 is connected to a side of the reel mounting reinforcement 500, and the roof rear rail 200 is connected to a rear side of the reel mounting reinforcement 500.

Due to the coupling structure of the reel mounting reinforcement 500, a structure is formed such that a rear end of a first side of the seat belt reel 600 is mounted on a front end of a side surface of the reel mounting reinforcement 500, a rear end of a second side of the seat belt reel 600 is mounted on the front end of the upper surface of the reel mounting reinforcement 500, the C-pillar reinforcement 400 is provided in front of the reel mounting reinforcement 500, such that a front end of the seat belt reel 600 is mounted on a rear end of the C-pillar reinforcement 400.

For example, a reel mounting bracket 610 is provided on the seat belt reel 600, and first, second, and third mounting portions are provided on front and rear ends of the reel mounting bracket 610 to be mounted on the reel mounting reinforcement 500 and the C-pillar reinforcement 400.

That is, a first mounting portion 612 of the reel mounting bracket 610 is mounted on the reel mounting reinforcement 500 connecting to the roof rear rail 200 behind the reel mounting reinforcement 500, and thus a load transfer path is formed in a direction of the roof rear rail 200.

In addition, a second mounting portion 614 of the reel mounting bracket 610 is mounted on the reel mounting reinforcement 500 connecting to the roof center rail 300 located on the side of the reel mounting reinforcement 500, and thus a load transfer path is formed in a direction of the roof center rail 300.

In addition, a third mounting portion 616 of the reel mounting bracket 610 is mounted on the C-pillar reinforcement 400 connecting to the C-pillar located at the front side, and thus a load transfer path is further formed in a direction of the C-pillar.

Therefore, since the seat belt reel 600 is mounted and a load concentrated on an anchoring of a corresponding seat belt is distributed through the roof center rail 300 located on the side, the D-pillar and the roof rear rail 200 which are located on the rear side, and the C-pillar located on the front side, load distribution efficiency may be maximized.

In addition, since the mounting position of the seat belt reel 600 is moved forward from a corner of an upper end of the D-pillar toward an upper end portion between the C-pillar and the D-pillar, a headroom space for a third-row passenger is secured to improve convenience of a passenger.

Figure 5:
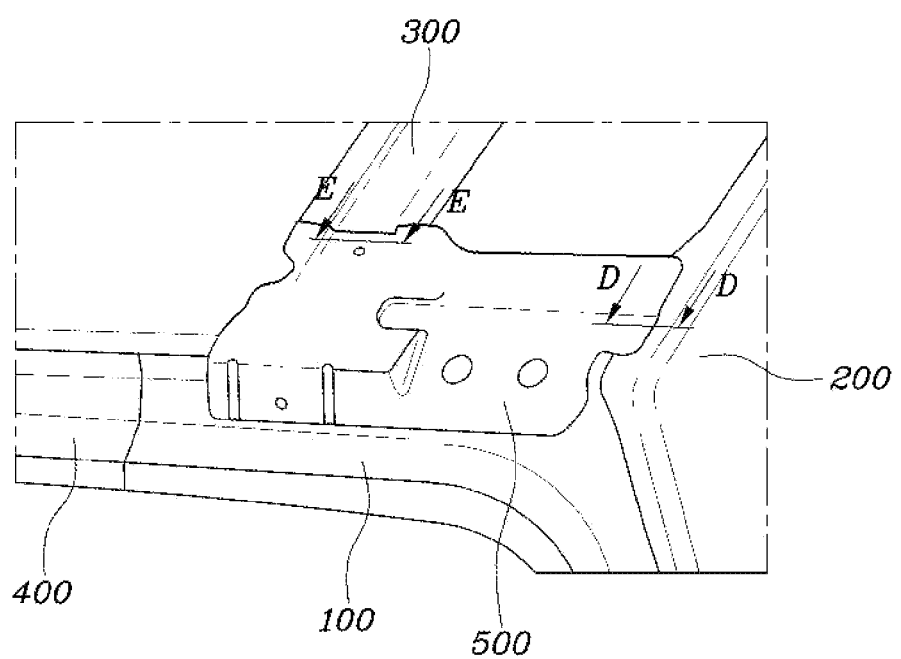
FIG. 5 is a diagram for describing a shape and a coupling structure of a reel mounting reinforcement according to the present disclosure.
Figure 6:
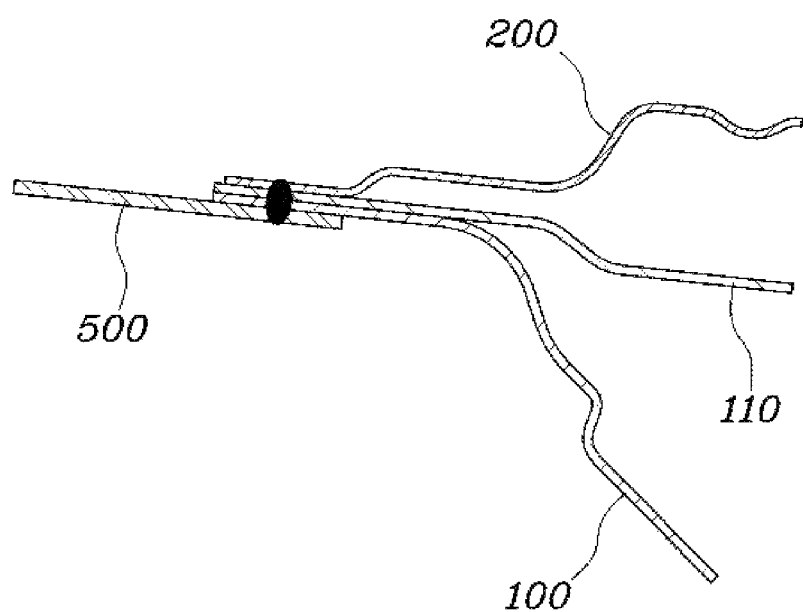
FIG. 6 is a cross-sectional view taken along line D-D of FIG. 5.

Meanwhile, FIG. 5 is a diagram for describing a shape and a coupling structure of the reel mounting reinforcement 500 according to the present disclosure, and FIG. 6 is a cross-sectional view taken along line D-D of FIG. 5.

To describe with reference to FIGS. 5 and 6, a structure is formed such that the side surface of the reel mounting reinforcement 500 is welded and bonded along the side surface of the quarter inner panel 100, and the quarter inner panel 100 and a D-pillar reinforcement 110 overlap so as to be welded and bonded between the reel mounting reinforcement 500 and the roof rear rail 200.

For example, the side surface of the reel mounting reinforcement 500 in an outer direction of the vehicle is formed in a shape bent downward, and the bent outer surface is welded to an inner surface of the vehicle of the quarter inner panel 100.

In addition, a rear end portion of the reel mounting reinforcement 500 is welded to the front end of the roof rear rail 200 as well as a front end of the quarter inner panel 100 and a front end of the D-pillar reinforcement 110.

Therefore, since a bonding force of the reel mounting reinforcement 500 fixed to a vehicle body is improved, rigidity of the anchoring of the seat belt mounted on the reel mounting reinforcement 500 is increased.

Figure 7:
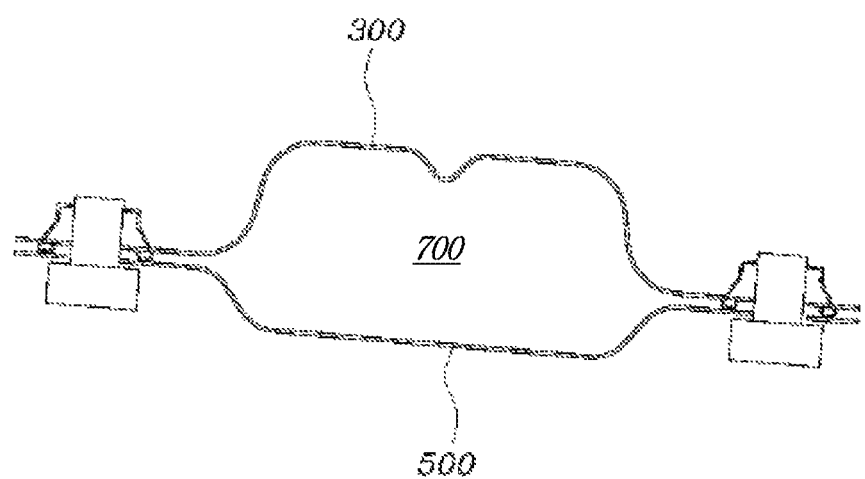
FIG. 7 is a cross-sectional view taken along line E-E of FIG. 5.

In addition, FIG. 7 is a cross-sectional view taken along line E-E of FIG. 5.

Referring to FIG. 7, a structure is formed such that a space 700 of a closed cross-section structure is formed between the roof center rail 300 and the reel mounting reinforcement 500, and the roof center rail 300 and the reel mounting reinforcement 500 are coupled at front and rear ends of the space 700.

For example, an intermediate portion of the roof center rail 300 is formed in the form of a downwardly recessed groove, and a portion of the reel mounting reinforcement 500 facing the intermediate portion of the roof center rail 300 is formed in the form of an upwardly recessed groove, and thus the space 700 is formed between the grooves.

In addition, a bonding part of the roof center rail 300 and the reel mounting reinforcement 500 which are coupled on both sides of the space 700 may employ a bolt bonding using bolts and nuts, but the bonding part may be fixed through welding.

That is, since a shape of a cross section in which the roof center rail 300 and the reel mounting reinforcement 500 are bonded is formed as a closed cross-sectional structure which is advantageous for rigidity and a load distribution, bonding rigidity of a corresponding mounting portion is increased, and thus distribution efficiency of a load transferred in the direction of the roof center rail 300 is further improved.

Figure 2:
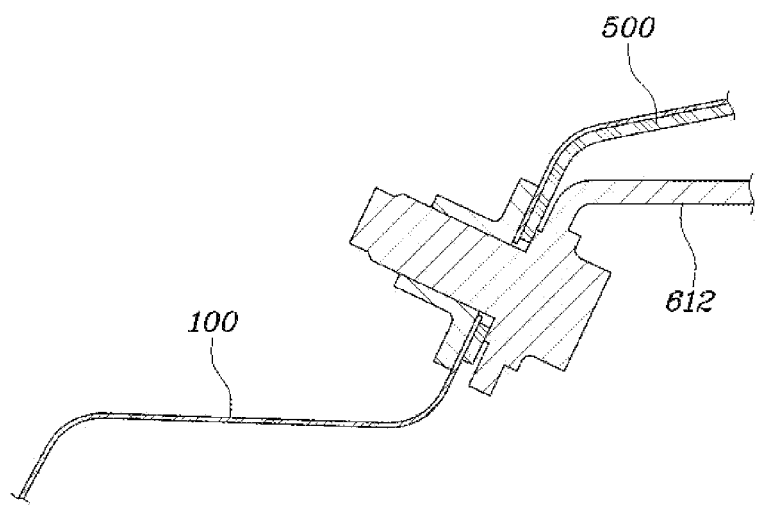
FIG. 2 is a cross-sectional view taken along line A-A of FIG. 1.

In addition, FIG. 2 is a cross-sectional view taken along line A-A of FIG. 1.

Referring to FIG. 2, a structure is formed such that the quarter inner panel 100 and the reel mounting reinforcement 500 overlap, and the first mounting portion 612 of the seat belt reel 600 is bolted at an overlapping portion.

That is, the side surface of the reel mounting reinforcement 500 overlaps to be fixed on a side surface of the quarter inner panel 100 toward the vehicle interior, and the first mounting portion 612 of the seat belt reel 600 is engaged with a front end portion of the reel mounting reinforcement 500 among overlapping portions.

Figure 3:
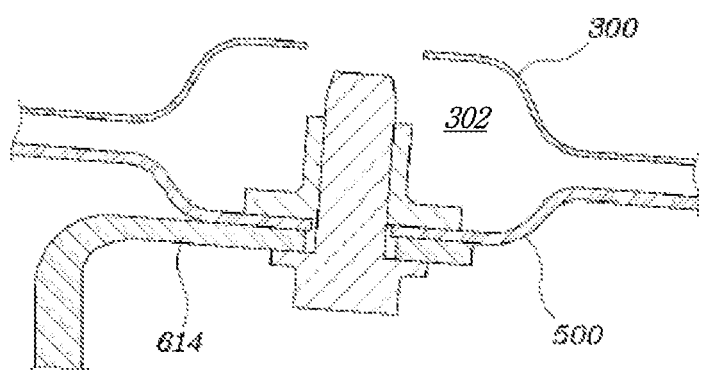
FIG. 3 is a cross-sectional view taken along line B-B of FIG. 1.

In addition, FIG. 3 is a cross-sectional view taken along line B-B of FIG. 1.

Referring to FIG. 3, a structure is formed such that a space 302 of a closed cross-section is formed between the roof center rail 300 and the reel mounting reinforcement 500, and the second mounting portion 614 of the seat belt reel 600 is bolted to the reel mounting reinforcement 500 forming the space 302.

That is, the upper surface of the reel mounting reinforcement 500 overlaps a bottom surface of the roof center rail 300, and the space 302 is formed between the intermediate portion of the roof center rail 300 and a portion of the reel mounting reinforcement 500 facing the intermediate portion.

In addition, the second mounting portion 614 of the seat belt reel 600 is engaged with the portion of the reel mounting reinforcement 500 forming the space 302.

Figure 4:
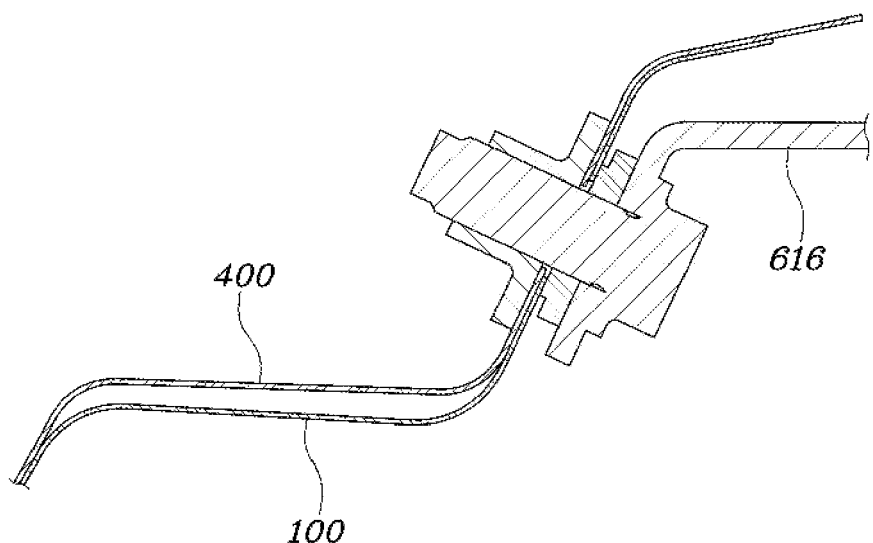
FIG. 4 is a cross-sectional view taken along line C-C of FIG. 1.

FIG. 4 is a cross-sectional view taken along line C-C of FIG. 1.

Referring to FIG. 4, a structure is formed such that the C-pillar reinforcement 400 and the quarter inner panel 100 overlap, and the third mounting portion 616 of the seat belt reel 600 is bolted to an overlapping portion.

That is, the quarter inner panel 100 overlaps to be fixed to a side surface of the C-pillar reinforcement 400 toward the vehicle interior to form the C-pillar, and the third mounting portion 616 of the seat belt reel 600 is engaged with a rear end portion of the C-pillar reinforcement 400 close to the reel mounting reinforcement 500 among overlapping portions.

According to the present disclosure, with the above configuration, the first mounting portion 612 is mounted on the reel mounting reinforcement 500 connecting to the roof rear rail 200 behind the reel mounting reinforcement 500, and thus the load transfer path is formed in the direction of the roof rear rail 200. In addition, the second mounting portion 614 is mounted on the reel mounting reinforcement 500 connecting to the roof center rail 300 located on the side of the reel mounting reinforcement 500, and thus the load transfer path is formed in the direction of the roof center rail 300.

In addition, the third mounting portion 616 is mounted on the C-pillar reinforcement 400 constituting the C-pillar located at the front side, and thus a load transfer path is formed in the direction of the C-pillar.

Therefore, since the seat belt reel 600 is mounted and a load concentrated on an anchoring of a corresponding seat belt is distributed through the roof center rail 300 located on the side, the D-pillar and the roof rear rail 200 which are located on the rear side, and the C-pillar located on the front side, load distribution efficiency is maximized.

In addition, since the mounting position of the seat belt reel 600 is moved forward from a corner of an upper end of the D-pillar toward an upper end portion between the C-pillar and the D-pillar, a headroom space for a third-row passenger is secured to improve convenience of a passenger.

In particular, since a reinforcement of the reel mounting reinforcement 500 is coupled to a position close to the C-pillar, the seat belt reel 600 together with the reel mounting reinforcement 500 is mounted using the existing C-pillar.

Therefore, since the mounting rigidity of the seat belt is secured by adding only the reel mounting reinforcement 500, a production cost and a weight are reduced through a reduction of the number of parts and rigidity of the anchoring of the seat belt is increased.

In accordance with the present disclosure, since a seat belt reel together with a reel mounting reinforcement is mounted using the existing C-pillar, mounting rigidity of a seat belt is secured by adding only the reel mounting reinforcement so that there is an effect of reducing a production cost and a weight through reduction of the number of parts and increasing rigidity of an anchoring of the seat belt.

In addition, since the seat belt reel is mounted and a load concentrated on an anchoring of a corresponding seat belt is distributed through a roof center rail located on a side, a D-pillar and a roof rear rail which are located on a rear side, and the C-pillar located on a front side, there is an effect of maximizing load distribution efficiency.

In addition, since a mounting position of the seat belt reel is moved forward from a corner of an upper end of the existing D-pillar toward an upper end portion between the C-pillar and the D-pillar, a headroom space for a third-row passenger is secured so that there is an advantage of improving convenience of a passenger.

Meanwhile, although the present disclosure has been described in detail with respect to only the above described specific examples, it is obvious to those skilled in the art that various modifications and alternations are possible within the technical scope of the present disclosure, and it is natural that such modifications and alternation fall within the appended claims.

What is claimed is:

1. A seat belt mounting structure, comprising:
   a reel mounting reinforcement configured to connect a quarter inner panel, a roof center rail, and a roof rear rail;
   a C-pillar reinforcement formed to extend toward the quarter inner panel behind a C-pillar; and
   a seat belt reel mounted on the reel mounting reinforcement and the C-pillar reinforcement.

2. The seat belt mounting structure of claim 1, wherein:
   a side surface of the reel mounting reinforcement is fixed to a side surface of the quarter inner panel;
   a rear end of the reel mounting reinforcement is fixed to a front end of the roof rear rail; and
   an upper surface of a front end of the reel mounting reinforcement is mounted on an end portion of the roof center rail.

3. The seat belt mounting structure of claim 2, wherein:
   a rear end of a first side of the seat belt reel is mounted on a front end of the side surface of the reel mounting reinforcement;
   a rear end of a second side of the seat belt reel is mounted on the upper surface of the front end of the reel mounting reinforcement; and
   the C-pillar reinforcement is provided in front of the reel mounting reinforcement, such that a front end of the seat belt reel is mounted on a rear end of the C-pillar reinforcement.

4. The seat belt mounting structure of claim 2, wherein:
   the side surface of the reel mounting reinforcement is welded and bonded along the side surface of the quarter inner panel; and
   the quarter inner panel and a D-pillar reinforcement overlap so as to be welded and bonded between the reel mounting reinforcement and the roof rear rail.

5. The seat belt mounting structure of claim 2, wherein:
   a space of a closed cross-sectional structure is formed between the roof center rail and the reel mounting reinforcement; and
   the roof center rail and reel mounting reinforcement are bonded on front and rear ends of the space.

6. The seat belt mounting structure of claim 1, wherein the quarter inner panel and the reel mounting reinforcement overlap, and a first mounting portion of the seat belt reel is bolted in an overlapping portion.

7. The seat belt mounting structure of claim 1, wherein a space of a closed cross-sectional structure is formed between the roof center rail and the reel mounting reinforcement, and a second mounting portion of the seat belt reel is bolted to the reel mounting reinforcement constituting the space.

8. The seat belt mounting structure of claim 1, wherein the C-pillar reinforcement and the quarter inner panel overlap, and a third mounting portion of the seat belt reel is bolted in an overlapping portion.

\* \* \* \* \*